United States Patent [19]

Presley

[11] 4,367,424
[45] Jan. 4, 1983

[54] ECCENTRICITY MODIFIER FOR EPICYCLIC GEAR ACTUATORS

[75] Inventor: Rex W. Presley, Livonia, Mich.

[73] Assignee: The Bendix Corporation, Southfield, Mich.

[21] Appl. No.: 258,718

[22] Filed: Apr. 29, 1981

[51] Int. Cl.³ .............................................. H02K 7/10
[52] U.S. Cl. ........................................ 310/82; 310/83
[58] Field of Search ................ 310/82, 83, 80; 74/804

[56] References Cited

U.S. PATENT DOCUMENTS

Re. 21,316  1/1940  Hill ..................................... 310/82 X
2,866,110  12/1958  Schön ..................................... 310/82
3,558,944  1/1971  Verge ..................................... 310/82
3,577,049  5/1971  Madurski et al. ..................... 310/826
3,770,997  11/1973  Presley ..................................... 310/82

Primary Examiner—Donovan F. Duggan

[57] ABSTRACT

An electric motor or actuator having a housing and a stator mounted to the housing about a central axis. The actuator includes a rotor that is mounted within the housing in surrounding relationship to the stator for moving in an orbiting manner with respect to the stator poles in response to the magnetic force. The rotor has an axis that is eccentrically positioned from the central axis by a distance $e_1$ and further includes a double eccentric that is mounted in rotating, surrounding relationship to the rotor and drivingly coupled thereto for transmitting the motion of the rotor to a ring gear. A stationary gear is attached to the housing and is mounted in surrounding relationship to the ring gear. The stationary gear includes a set of gear teeth which react with a coacting set of gear teeth on the ring gear, thus causing the ring gear to turn in response thereto. The rotating motion of the ring gear is transmitted to an output gear which is mounted in surrounding relationship to the stator gear and to the ring gear.

7 Claims, 4 Drawing Figures

ECCENTRICITY MODIFIER FOR EPICYCLIC GEAR ACTUATORS

BACKGROUND AND SUMMARY OF THE INVENTION

This invention relates to motors or actuators having variable air gaps and an eccentrically positioned epicyclic transmission.

Prior art motors and actuators have utilized a rotor that is eccentrically positioned relative to the central axis of the actuator and constrained to orbit about a small radius which is typically 3/64 inch (1.2 mm). The orbit radius is determined, inter alia, by the eccentric distance. Typically, these actuators comprise a rotor which operatively drives a floating ring gear, which may, in turn interact with a stationary gear that is mounted to the housing. However, a ring gear that is positioned in a floating relationship between the stationary gear and output gear will show a tendency to jump out of gear mesh and bind. In operation, the reaction forces between the ring gear and the stationary gear causes the ring gear to rotate relative to the stationary gear. The ring gear is drivingly connected to and turns an output gear. In electric actuators, the eccentricity, or the orbit radius, must be small to maintain a small air gap for efficient actuator operation. Typically the ring gear is driven by the rotor consequently the ring gear and the remaining portions of the epicyclic gearing or transmission have the same eccentricity. The prior actuators, were low power transmition devices, consequently, small eccentric gearing did not represent a severe problem. Because of these small eccentricies, the gearing often comprised fine pitch gears which are not satisfactory for transmitting high power. Conversely, high torque devices employ larger air gaps which tend to decrease the efficiency of operation of the motor.

An object of the present invention is to provide a motor or actuator having a rotor that orbits about a small radius for efficient electric operation while simultaneously permitting the ring gear to rotate about a larger eccentric distance thereby permitting the utilization of gears designed to transmit high levels of torque.

A feature of the present invention is a double eccentric which is a mechanism that is free to rotate about a set of support bearings. The double eccentric causes the rotor and the ring gear to move with an eccentric motion of varying degree.

An advantage of the present invention is that the double eccentric, rotor and ring gear may be configured such that the motion of the rotor and ring gear move oppositely, thus dynamic balancing the motor.

According to the embodiments of the invention as described below, the invention comprises an electric motor or actuator having a housing and a stator mounted to the housing about a central axis. The stator includes a plurality of stator poles having at least one coil wound thereabout for developing a magnetic field in response to activation signals input to a particular coil. In one embodiment the actuator includes a rotor that is mounted within the housing in surrounding relationship to the stator for moving in an orbiting manner with respect to the stator poles in response to the magnetic force. The rotor has an axis that is eccentrically positioned from the central axis by a distance $e_1$ and further includes a double eccentric that is mounted in rotating, surrounding relationship to the rotor and drivingly coupled thereto for transmitting the motion of the rotor to a ring gear. The double eccentric includes a cylindrical first or inner surface surrounding the rotor and has an axis that is coaxial to the axis of the rotor and further includes a cylindrical second or outer surface having another axis that is eccentrically positioned from the central axis by a distance $e_2$. Drive bearings are concentrically positioned with respect to the inner surface of the double eccentric and interpose the inner surface of the double eccentric and the outer surface of the rotor. The drive bearings transmit the motion of the rotor to the double eccentric. The actuator additionally includes a ring gear that is positioned in surrounding relationship relative to the second surface of the double eccentric and is mounted coaxially with respect to the axis of the outer surface of the double eccentric. The ring further includes a plurality of sets of gear teeth that are disposed about an outer surface and wherein the rotor further includes an inner surface. The second set of drive bearings interposes the inner surface of the ring gear and the outer surface of the double eccentric. This second set of drive bearings transmits the driving force from the double eccentric to the ring gear. A stationary gear is attached to the housing and is mounted in surrounding relationship to the ring gear. The stationary gear includes a set of gear teeth which react with a coacting set of gear teeth on the ring gear, thus causing the ring gear to turn in response thereto. The rotating motion of the ring gear is transmitted to an output gear which is mounted in surrounding relationship to the stator gear and to the ring gear.

An alternate embodiment of the invention is also described which describes an electric actuator which utilizes an output gear which is disposed along the central axis of the actuator.

Many other objects and purposes of the invention will be clear from the following detailed description of the drawings.

DETAILED DESCRIPTION OF THE DRAWINGS

Figure 1:
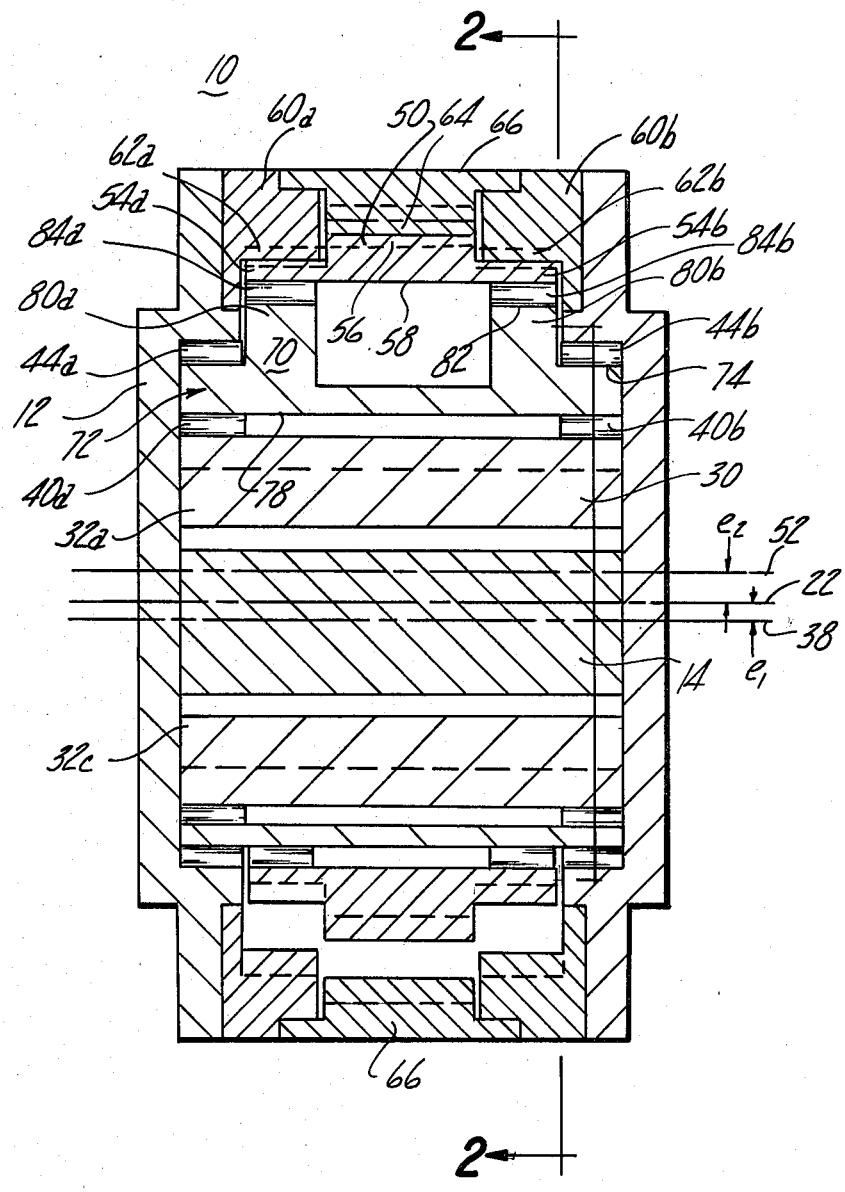
FIG. 1 is a cross-sectional view illustrating the major components of one embodiment the present invention.
Figure 2:
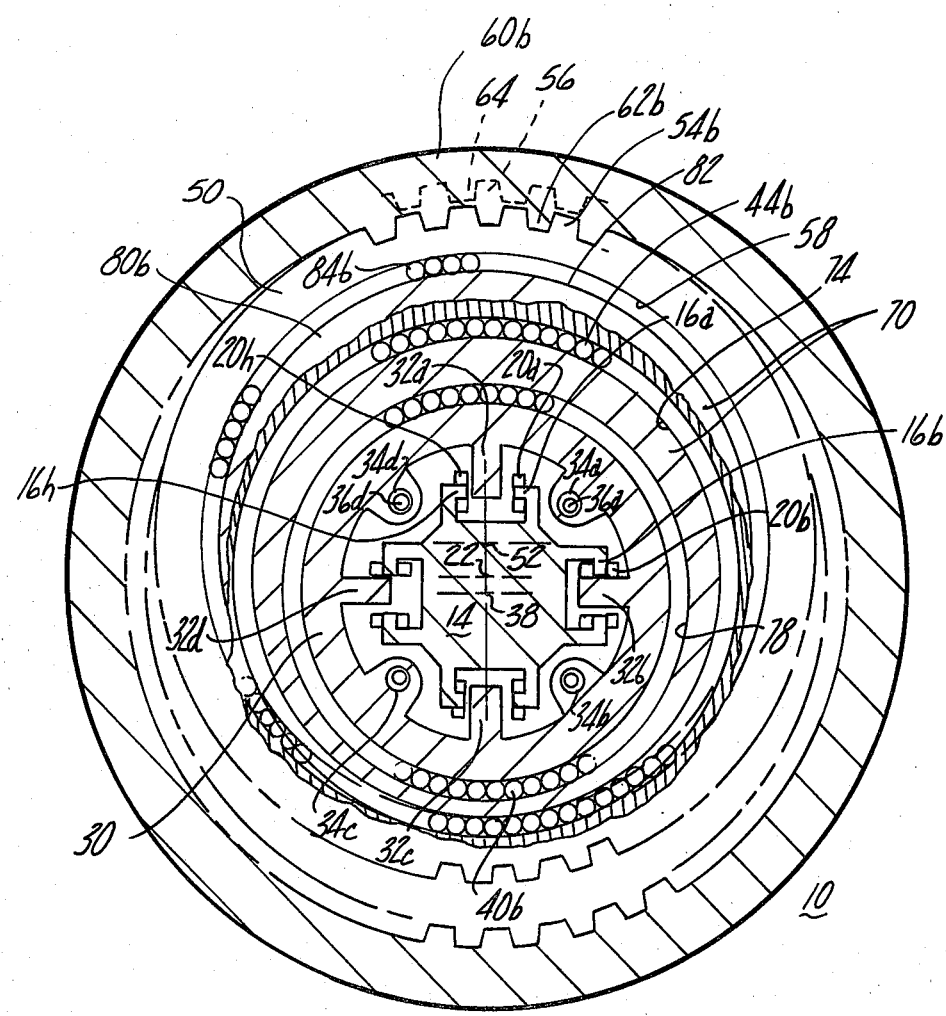
FIG. 2 is a cross-sectional view taken through Section 2—2 of FIG. 1.
Figure 3:
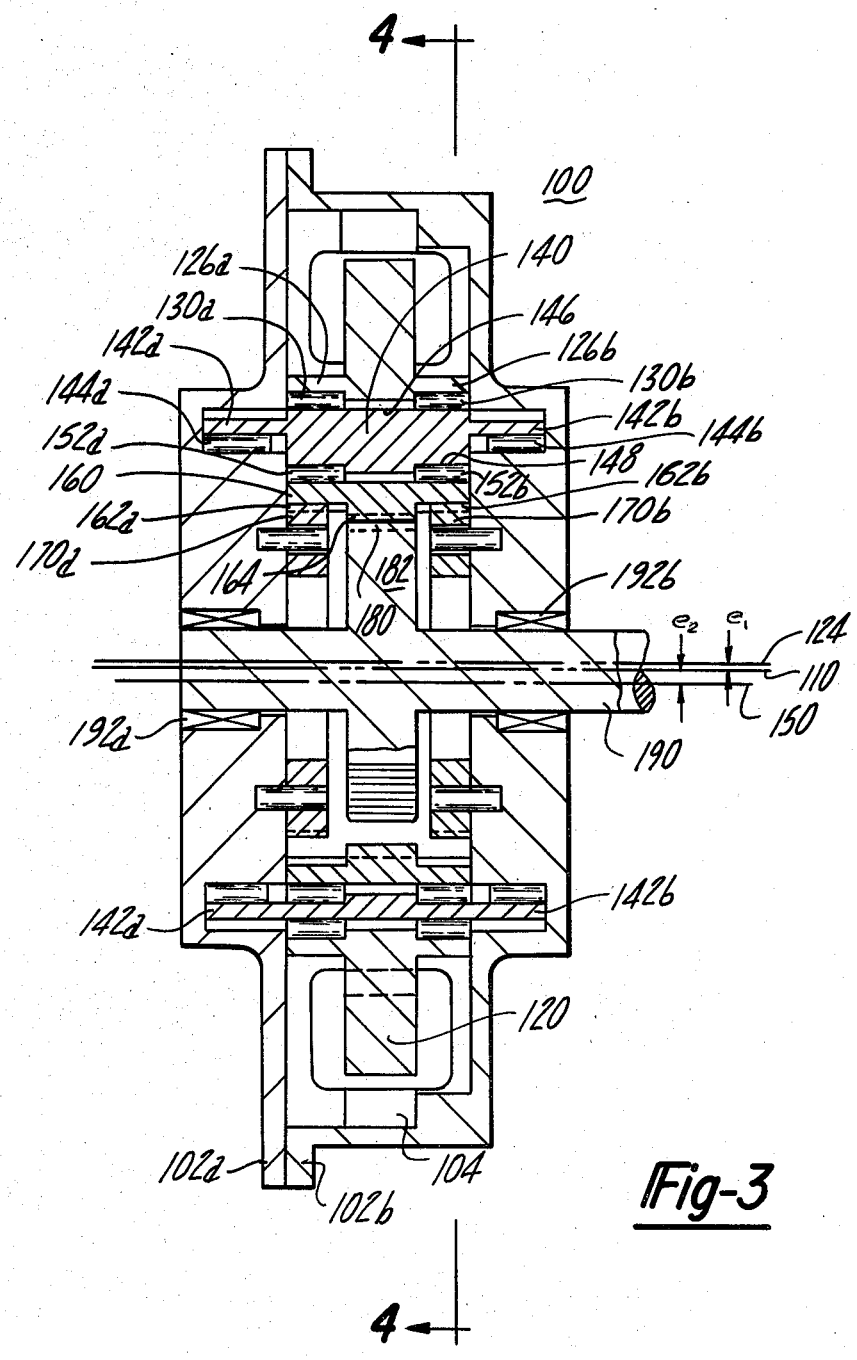
FIG. 3 is a cross-sectional view of another embodiment of the invention.
Figure 4:
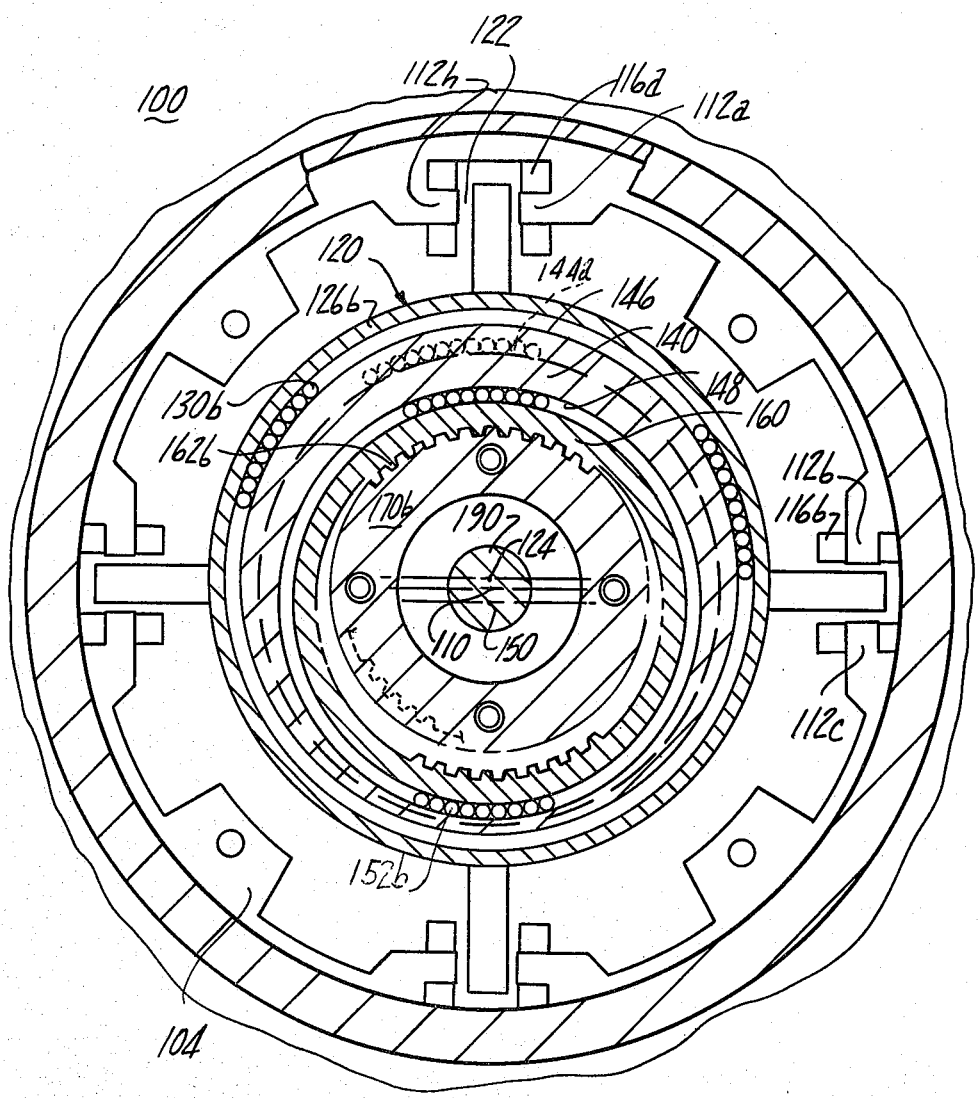
FIG. 4 is a cross-sectional view taken through Section 4—4 of FIG. 3.

Reference is now made to FIGS. 1 and 2. These figures illustrate a preferred embodiment of the invention as an electric motor or actuator, generally designated as 10. The embodiment illustrated in FIGS. 1 and 2 represents an inverted gearing arrangement. The driven or output gear 66 is positioned near the outside of the actuator and has the largest diameter. Those familiar with the art will appreciate that a principle limit to the torque transmitted to a load is dependent upon the strength of the output gear. It can be shown that the load carrying capacity of the output gear increases as the square of its diameter. To achieve the maximum diameter of the output gear, an inverted gearing arrangement as illustrated in FIGS. 1 and 2 is employed. FIGS. 3 and 4 illustrate an alternate embodiment of the invention illustrating a more conventional gearing arrangement in which the output gear is directly attached to an output shaft which is located along a central axis of the actuator. While the embodiments of the invention presented herein comprise electric actuators this is not a limitation of the present invention. The present invention may be applied to hydraulic, electric or pneumatic actuators or combinations thereof in a manner as taught by Presley in the commonly assigned patent application having Ser. No. 230,161, filed Jan. 30, 1981 entitled "Ultra High Torque Actuator" which is expressly incorporated by reference.

The actuator 10 includes a housing 12 having a stator 14 that is fixedly mounted to the interior of the housing. The stator 14 comprises a plurality of electric poles 16a-h arranged in a paired relationship. This relationship is more clearly shown in FIG. 2. The stator 14 further includes a plurality of electric coils 20a-h, one associated with each of the electric poles 16a-h. The actuator 10 further includes a rotor 30 that has a manner of inwardly directed radial projections 32a-d that are preferably fabricated of a ferromagnetic material and responsive to the magnetic fields produced upon the selective excitation of the coils 20. These projections 32 may be an integral part of the rotor 30 or separate pieces attached thereto. The rotor 30 is eccentrically positioned relative to the central axis 22 by the pair of roller bearings 40a and 40b, however, only the bearing 40b is shown in FIG. 2. The axis of the rotor is generally designated as 38. The rotor may further includes a plurality of holes 34a-d that are adapted to coact with the reaction pins 36a-d such that the rotor will orbit or be displaced about these pins relative to the stator 14. The reaction pins 36 are supported by the housing. As illustrated in FIGS. 1 and 2, the rotor 30 is constrained to move eccentrically about its axis 38 that is positioned below the central axis 22 by a distance $e_1$. The actuator 10 further includes a ring gear 50 that is constrained to move about its axis 52 which is eccentrically positioned at a distance $e_2$ from the central axis 22. The ring gear 50 has a first set of gear teeth, generally designated as 54a and b, which interact with the teeth of a pair of stationary or ground gears 60a and b. Each of the ground gears 60a and b which react against the ring gear 50 to cause it to turn. The ring gear 50 further includes another set of gear teeth 56 that is designed to coact with the gear teeth 64 of the output gear 66.

The actuator 10 further includes a double eccentric 70 that is positioned between the rotor 30 and the ring gear 50. The double eccentric 70 constrains the rotor 30 to move with low eccentricity $e_1$ and further drives the ring gear 50 to rotate about the central axis 22 with the greater eccentricity $e_2$. The double eccentric 70 is operatively connected to the rotor 30 through the bearings 40a and 40b and is driven by the rotor 30 to rotate about the axis 38 at orbiting speed. The double eccentric 70 comprises a hollow cylinder 72 having a circular cylindrical outer surface 74. The outer surface 74 is positioned concentrically relative to the axis 22 and maintained in alignment therewith by the set of bearings 44a and b. The hollow cylinder 72 further includes a circular cylindrical inner or first surface 78 having an axis that is eccentrically positioned coaxial to the axis 32 of the rotor 30. In addition, the surface 78 is positioned coaxially with the outer surface of the rotor 30 and maintained in driving engagement therewith by the bearings 40a and 40b. The eccentric 70 further includes a plurality of lobes 80a and b positioned about the outer surface 74 of the cylinder 72. The outer portion of the lobes 80a and b forms a second circular cylindrical surface 82 having an axis positioned eccentrically at a distance $e_2$ from the central axis 22 and coaxially aligned with the axis 52 of the ring gear 50. A set of drive bearings 84a and b connect surface 82 with a surface 58 of the ring gear 50.

The embodiment illustrated in FIG. 1 shows two lobes 80a and b. This not a requirement of the invention. As an example, the circular cylindrical second surface 82 may be fabricated to include a single continuous surface spanning the gap between the presently existing lobes 80a and b.

In operation, the stator 14, in response to the activation signals applied to particular coils 20, will produce a magnetic field therein attracting the rotor toward the appropriate set of poles 16a-h. In response to this magnetic field, the rotor 30 will be displaced about the reaction pins 36a-d. The rotor 30 will be constrained to move in an orbiting manner by the first surface 78 of the double eccentric 70 and by the drive bearings 40a and 40b. Those skilled in the art will appreciate that depending upon the gearing configuration, the motion of the rotor will be a displacement, or orbiting motion, or a combination of an orbiting motion plus a low speed rotation. The motion of the rotor 30 is communicated to the double eccentric 70 through the drive bearings 40a and b therein causing the eccentric 70 to rotate at the orbit frequency of the rotor 30. This rotation causes a compound motion of the first and second surfaces 78 and 82, respectively. The first surface 78 will rotate about its axis 38 and the second surface 82 will rotate about its eccentric axis 52. The rotation of the second surface 82 is communicated to the ring gear 50 through the drive bearings 84a and b. The ring gear 50 is caused to rotate by the coaction between the driving force received through the drive bearings 84 and the reactive force at the gear tooth interface with the stationary or ground gears 60a and b. Since the ring gear 50 is positioned in driving relationship with the output gear 66, the rotational motion of the ring gear 50 therein causes the output gear 66 to turn.

It can, therefore, be seen that by utilizing a double eccentric 70 having a first surface 78 positioned at a smaller eccentric distance $e_1$, the air gap between the rotor and stator may be controlled for efficient electric motor operation. In addition, the utilization of the second surface 82, having an axis eccentrically positioned at a larger eccentric distance, $e_2$, permits the optimization of and independent design of the gearing.

Another advantage of the present invention is that the ring gear 50 may now be made to orbit 180° out of phase with the motion of the rotor 30 thus providing a degree of dynamic balancing. This feature is incorporated within the embodiment of the invention shown in FIGS. 3 and 4.

Reference is now made in FIGS. 3, and 4 which illustrate another embodiment of the invention showing an actuator 100 utilizing a centrally located output gear 182. The actuator 100 comprises a split housing having sections 102a and 102b which are joined together in a known manner. The housing has attached thereto a laminated stator 104 having situated about its central axis 110 a plurality of magnetic poles 112a-h. Each pole 112 has associated therewith at least one electromagnetic coil 116a-h that is responsive to input command signals. In the embodiment illustrated, each pole 112 has two associated coils 116. The actuator 100 further comprises a rotor 120 which is eccentrically positioned relative to the stator to produce a variable air gap 122 therebetween. The rotor has a central axis, generally designated as 124, which is eccentrically positioned relative to the central axis 110 by an amount $e_1$. The rotor 120 comprises a dual flange 126a and 126b having attached to its underside the drive bearings 130a and 130b which are positioned concentric with the rotor axis 124 and which are eccentrically positioned relative to the central axis 110. The actuator 100 further includes a double eccentric 140 which includes a double flange 142a and b which is concentrically positioned about the central axis 110 by the bearings 144a and b. The double eccentric 140 further includes a first circular cylindrical surface 146 positioned concentrically with the drive bearings 130a and 130b and an inner circular cylindrical surface 148 having an axis 150 which is eccentrically positioned at a distance $e_2$ relative to the central axis 110. A pair of bearings 152a and 152b supports the inner surface 148 of the double eccentric 140. The actuator 100 includes a ring gear 160 which rotates with eccentricity $e_2$ about the central axis 110. The ring gear is constrained by the double eccentric to move with combined rotation and orbiting motion so that contact between the mating gears always occurs at the gear tooth pitch line. A ring gear 160 comprises a first set of gear geeth 162a and 162b that are adapted to engage the mating teeth of the oppositely situated stationary or ground gears 170a and 170b. The ground gears 170 are fixedly attached to the housing 102a and 102b. The ring gear 160 further includes the gear teeth generally designated as 164 which are adapted to engage a mating set of gear teeth 180 which are situated on the output gear 182. The output gear 182 is centered about the axis 110 and is directly connected to the output shaft 190 which in turn is rotatably positioned within the housing by the bearings 192a and 192b.

Many changes and modifications in the above-described embodiments of the invention can, of course, be carried out without departing from the scope thereof. Accordingly, that scope is intended to be limited only by the scope of the appended claims.

Having thus described the invention, what is claimed is:

1. An actuator (10) comprising:
   a housing (12);
   stator means (14) fixed to said housing (12) having a plurality of poles (16) positioned about a central axis (22), each of said poles having associated therewith at least one coil (20), for developing a magnetic force;
   rotor means (30), mounted within said housing and having an axis (38) eccentrically positioned relative to the central axis (22), said rotor means including means (32, 34, 36) for responding to said magnetic force to cause said rotor to orbitally move in response to said magnetic force;
   stationary gear means (60) fixed to said housing (12), in coaxial relationship relative to said central axis;
   a rotatably mounted output gear (66) positioned coaxially relative to said stationary gear means;
   a ring gear (50) eccentrically positioned from said central axis and positioned to engage said stationary gear means and to drivingly engage said output gear, said ring gear having an axis (52) positioned eccentrically at a distance $e_2$ from the axis of said stationary gear means;
   double eccentric means (70), rotably driven by said rotor means (30) including first means (78) for constraining said rotor means to move with eccentric motion about its axis and second means (82) for constraining said ring gear to move with eccentric motion about its respective axis;
   first drive bearing means (40), concentrically positioned relative to the axis of said rotor means interposing said rotor means and said first constraining means (78) for transmitting the motion of said rotor means to said double eccentric means; and
   second drive bearing means (84) concentrically positioned relative to the axis of said stationary gear means, interposing said second constraining means (82) and said ring gear for driving said ring gear.

2. The actuator as defined in claim 1 wherein said double eccentric means comprises:
   a hollow cylinder (72) having a circular cylindrical outer surface (74) concentrically situated about said central axis (22), and a circular cylindrical inner or first surface (78) having a first axis eccentrically positioned relative to said central axis, and a circular cylindrical second surface (82) having a second axis.

3. The actuator as defined in claim 2 further including:
   bearing means (44), positioned between said cylindrical outer surface (74) and said housing for rotatingly supporting said double eccentric means.

4. The actuator as defined in claim 3 wherein said axis of said rotor means is positioned below said central axis and wherein said axis of said ring gear is positioned above said central axis.

5. The actuator as defined in claim 4 wherein said double eccentric means includes dynamic balancing means for causing the motion of said rotor means and the motion of said ring gear to be out of phase by approximately 180° degrees.

6. The actuator as defined in claim 1 or 5 wherein said output gear is positioned along said central axis;
   said ring gear is positioned in contacting engagement surrounding said output gear, and wherein said double eccentric means is positioned in contacting engagement about said ring gear and between said rotor means.

7. An actuator (10) comprising:
   a housing (12);
   stator means (14) fixed to said housing (12) and positioned coaxially with respect to a central axis (22), said stator means including a plurality of poles (16) having at least one coil (22) would thereabout for developing a magnetic field in response to activation signals input to particular ones of said coil;
   rotor means (30) mounted within said housing in surrounding relation to said stator means for moving in an orbiting manner with respect to said poles (16) in response to said magnetic field and wherein said rotor means moves about an axis (38) that is eccentrically positioned from said central axis (22) by a distance $e_1$;
   eccentric means (70) mounted in rotating surrounding relationship about said rotor means and drivingly coupled thereto, for transmitting the motion of said rotor means to a ring gear (50);
   said eccentric means including a cylindrical first or inner surface (78) surrounding said rotor, having an axis that is coaxial to said axis of said rotor means; and a cylindrical second or outer surface (82) having an axis that is eccentrically positioned from said central axis by a distance $e_2$;

first drive bearing means (40) concentrically positioned with respect to said inner surface (78) and interposing said inner surface and said rotor means for transmitting the motion of said rotor means to said eccentric means;

a ring gear (50) positioned in surrounding relationship to said second surface, and mounted coaxially with respect to the axis of said outer surface (82), and having a plurality of sets of gear teeth disposed about its outer surface and further having an inner surface;

second drive bearing means (84), interposing said inner surface of said ring gear and said outer surface of said eccentric means for driving said ring gear;

stationary gear means (60) attached to said housing in surrounding relation to the gear teeth of said ring gear having gear teeth for reacting against at least one set of the gear teeth of said ring gear; and output gear means (66) located in surrounding relation to said ring gear, in contacting relation with at least a portion of said ring gear for rotating about said central axis in response to the motion of said ring gear.

* * * * *